(12) United States Patent
Ewers

(10) Patent No.: US 10,436,234 B2
(45) Date of Patent: Oct. 8, 2019

(54) QUICK RELEASE FASTENER FOR A BAND SAW

(71) Applicant: FREUND Maschinenfabrik GmbH & Co. KG, Paderborn (DE)

(72) Inventor: Christoph Ewers, Willebadessen (DE)

(73) Assignee: FREUND Maschinenfabrik GmbH & Co. KG, Paderborn (DE)

( * ) Notice: Subject to any disclaimer, the term of this patent is extended or adjusted under 35 U.S.C. 154(b) by 338 days.

(21) Appl. No.: 15/223,665

(22) Filed: Jul. 29, 2016

(65) Prior Publication Data

US 2017/0028487 A1   Feb. 2, 2017

(30) Foreign Application Priority Data

Jul. 29, 2015  (DE) .................... 20 2015 103 966 U

(51) Int. Cl.
| | | |
|---|---|---|
| A22B 5/20 | (2006.01) | |
| B23D 55/00 | (2006.01) | |
| B25F 5/02 | (2006.01) | |
| F16B 2/24 | (2006.01) | |
| A22B 5/00 | (2006.01) | |

(52) U.S. Cl.
CPC .............. *F16B 2/248* (2013.01); *A22B 5/0017* (2013.01); *A22B 5/208* (2013.01); *B23D 55/00* (2013.01); *B25F 5/02* (2013.01); *Y10T 24/4501* (2015.01); *Y10T 403/591* (2015.01); *Y10T 403/608* (2015.01)

(58) Field of Classification Search
CPC ................. A22B 5/0017; A22B 5/208; B23D 53/00–12; B23D 55/00–10; B25F 5/02; B26D 7/22; B27B 13/00; B27B 13/16; F16B 2/248; F16B 3/04; F16B 5/0036; F16B 5/0657; F16B 5/0664; F16B 7/042; F16B 7/22; Y10T 24/4501; Y10T 83/7226; Y10T 403/32483; Y10T 403/59; Y10T 403/591; Y10T 403/595; Y10T 403/599; Y10T 403/60; Y10T 403/606; Y10T 403/608
USPC ...... 403/109.3, 321, 322.1, 322.4, 325, 326, 403/329, 330, DIG. 4; 83/788–820; 24/573.11
See application file for complete search history.

(56) References Cited

U.S. PATENT DOCUMENTS

| | | | | |
|---|---|---|---|---|
| 3,177,024 A | * | 4/1965 | Krook ................. | E05B 3/003 403/330 |
| 4,160,320 A | * | 7/1979 | Wikoff ................ | B23D 53/12 83/817 |
| 4,212,104 A | * | 7/1980 | Wikoff ................ | B23D 53/12 30/380 |
| 4,242,798 A | * | 1/1981 | Wikoff ................ | A22B 5/208 30/380 |
| 4,431,331 A | * | 2/1984 | Brody ................ | F16B 7/0446 403/329 |

(Continued)

*Primary Examiner* — Josh Skroupa
(74) *Attorney, Agent, or Firm* — Muncy, Geissler, Olds & Lowe, P.C.

(57) ABSTRACT

A quick release fastener for a hand-operated band saw with a saw band run on wheels in a housing, which has a base tray and a hinged lid and on which there is a handle. The handle is fixed to an upper angled edge of the lid and located below the handle there is a spring-loaded handle bar with two bent ends. The one end is fixed at the edge of the lid and the other end engages in a groove in the base tray through a recess in the edge.

11 Claims, 2 Drawing Sheets

(56) References Cited

U.S. PATENT DOCUMENTS

| | | | | |
|---|---|---|---|---|
| 4,504,164 A * | 3/1985 | Bien | ................. | B62D 1/16 |
| | | | | 403/330 |
| 4,869,280 A * | 9/1989 | Ewing | ................. | F16B 7/042 |
| | | | | 135/69 |
| 5,779,386 A * | 7/1998 | Eichhorn | ............ | A47D 13/105 |
| | | | | 403/329 |
| 6,141,912 A * | 11/2000 | Graham | ................. | E06B 9/02 |
| | | | | 49/465 |
| 7,172,166 B2 * | 2/2007 | Wang | ................. | F16B 7/105 |
| | | | | 248/317 |
| 8,590,553 B2 * | 11/2013 | Lovley, II | ............ | E04H 15/46 |
| | | | | 135/120.2 |
| 9,080,585 B2 * | 7/2015 | Lai | ................. | F16B 7/105 |
| 2006/0046899 A1 * | 3/2006 | Wang | ................. | F16B 7/042 |
| | | | | 482/27 |

* cited by examiner

QUICK RELEASE FASTENER FOR A BAND SAW

This nonprovisional application claims priority under 35 U.S.C. § 119(a) to German Patent Application No. 20 2015 103 966.2, which was filed in Germany on Jul. 29, 2015, and which is herein incorporated by reference.

BACKGROUND OF THE INVENTION

Field of the Invention

The invention relates to a quick release fastener for a hand-operated band saw with a saw band run on wheels in a housing, which has a base tray and a hinged lid and on which there is a handle.

Description of the Background Art

Hand-operated band saws are widely used. An application with special requirements is the use, for example, in the meat industry, where the band saw is used for cutting carcasses. Here, strict hygienic requirements must be observed.

In hand-operated band saws, band saw blades have to be rotated 90° in the cutting area, so that the cuts are made from above. A problem of band saws is the relatively short service life of the band saw blades. By rotating the band saw blades, these are heavily loaded and break after a relatively short time. Therefore, the band saw blades must be changed frequently, which results in each case in an interruption of sawing.

In known hand-operated band saws, the lid is secured by rotary or screw closures on the base tray. Opening and closing is thus relatively expensive and the rotary or screw heads are susceptible to contamination in the meat cutting operation.

In other known band saws, a complicated lever mechanism is provided.

SUMMARY OF THE INVENTION

It is therefore an object of the present invention to provide a closure that is very easy to handle, which is also less susceptible to contamination.

In an exemplary embodiment, a quick release fastener is provided for a hand-operated band saw, which has a saw band run on rollers in a housing. The housing has a base tray and a hinged cover on which there is a handle.

The handle is fixed to an upper angled edge of the lid. Under the handle, there is a spring-loaded handle bar with two bent ends. Here, the one end is fixed at the edge of the lid and the other end engages in a groove in the base tray through a recess in the edge.

By positioning the handle bar below the handle, it is initially protected. However, it can also be actuated by a simple grasping of the handle. Except for the small recess in the edge of the lid, in which also the end of the handle bar is guided, no cavities for possible impurities are present. The housing can thus be designed very smooth, making it easy to keep clean.

The handle bar can be made of a round spring wire. This eliminates a common additional spring for the locking mechanism. The round spring wire is also easy to keep clean.

The recess in the edge of the lid can be designed as a slot, which is slightly wider than the diameter of the spring wire. Thus, the handle bar can be moved easily and there are also no cavities for contaminants.

The end of the handle bar reaching through the recess can be bent back U-shaped. In this way, the slot is largely closed off and impurities do not enter the interior of the band saw.

The groove can be located in an upper edge of the base tray, which engages under the upper edge of the lid. The groove is thus positioned such, that the end of the handle bar engages in this groove in the closed state of the housing and locks the housing.

The groove can be only slightly wider than the diameter of the spring wire. Thus, the quick release fastener has little game in the closed state.

Next to the groove an angular catch can be arranged. When closing the housing, the handle bar is pressed up over it and the end of the handle bar jumps into the groove. In this way, the housing can be very easily snapped shut and locked at the same time.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
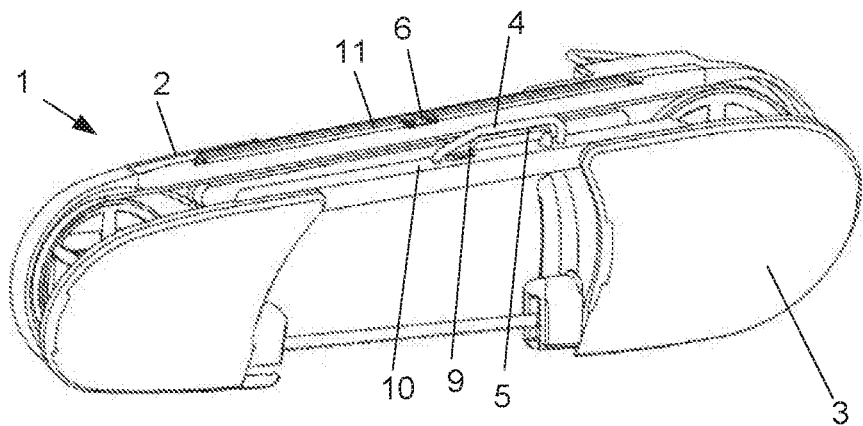
FIG. 1 illustrates a slightly open band saw.

FIG. 1 shows a slightly open band saw. The housing 1 has the base tray 2 and the swivel-mounted lid 3. The handle 4 is attached to the upper edge 10 of the lid 3. Underneath is the handle bar 5. The groove 6 is incorporated in the upper edge 11 of the base tray 2. The engagement of the second end 9 of the handle bar 5 in the groove 6 locks the housing 1.

Figure 2:
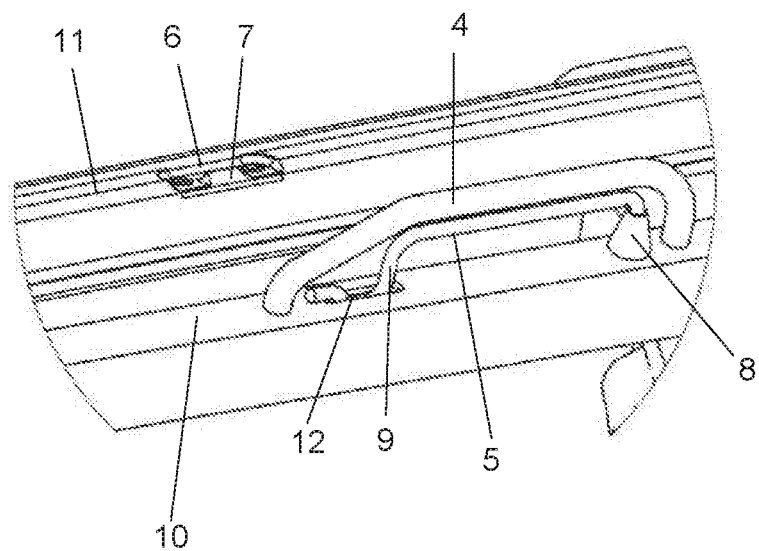
FIG. 2 is a detailed view of the quick release fastener in an open state.

FIG. 2 shows a detailed view from FIG. 1. The handle bar 5 is positioned below the handle 4 on the upper edge 10 of the lid 3. The first end 8 of the handle bar 5 is mounted on the edge 10, for example, screwed in from below.

The second end 9 of the handle bar 5 immerses with its U-shape in the slot 12.

On the upper edge 11 of the base tray is the groove 6, opposite the slot 12. The angular catch 7 allows for the second end 9 of the handle bar 5 to slide into the groove 6.

Figure 3:
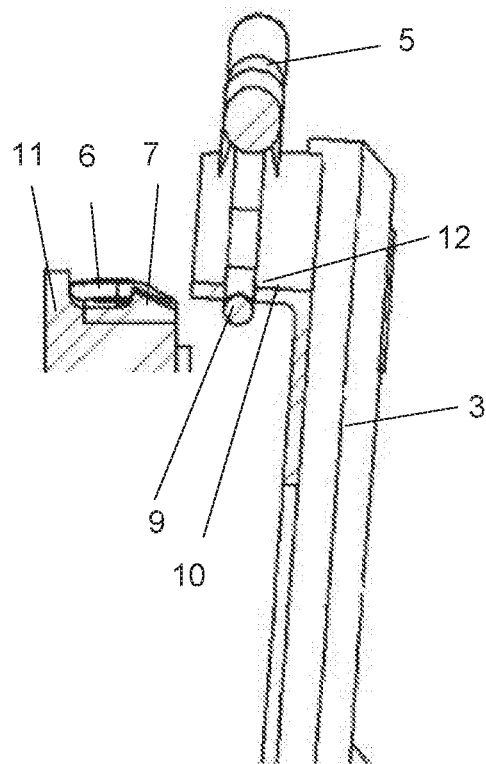
FIG. 3 illustrates a cross section through the quick release fastener in the open state.
Figure 4:
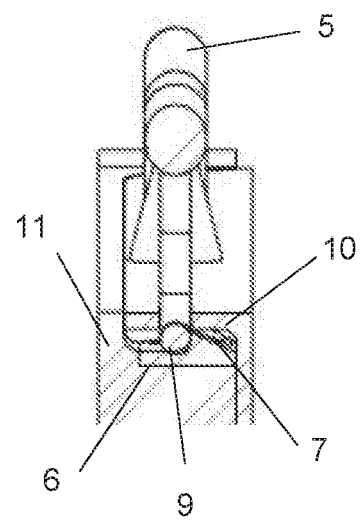
FIG. 4 illustrates a cross section through the quick release fastener in the closed state.

FIGS. 3 and 4 illustrate a cross section through the quick release fastener in the opened and in the closed state. The handle bar 5 is mounted at the upper edge 10 of the lid 3, which with its bent end 9 dips through the slot. When closing the housing, the bent end 9 slides over the angular catch 7 into the groove 6, which is located in the upper edge 11 of the base tray 2.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A quick release fastener system comprising:
   a base component,
   a hinged component,
   a handle fixed to an upper edge of the hinged component,
   a spring-loaded handle bar arranged below the handle, the handle bar having two bent ends,
   a recess in the upper edge of the hinged component, and
   a groove in the base component,
   wherein one end of the handle bar is fixed to the upper edge of the hinged component and the other end engages in the groove in the base component through the recess in the upper edge of the hinged component, and
   wherein the one end of the handle bar is directly fixed to an exterior surface of the upper edge of the hinged component, such that all portions of the handle bar, except for a portion of the other end of the handle bar that engages in the groove through the recess, are positioned at an exterior of the hinged component.

2. The quick release fastener system according to claim 1, wherein the handle bar is a round spring wire.

3. The quick release fastener system according to claim 2, wherein the recess in the upper edge of the hinged component is a slot which is wider than a diameter of the spring wire.

4. The quick release fastener system according to claim 3, wherein the other end of the handle bar reaching through the recess is bent back U-shaped.

5. The quick release fastener system according to claim 2, wherein the groove is wider than a diameter of the spring wire.

6. The quick release fastener system according to claim 1, wherein the groove is arranged in an upper edge of the base component, which engages beneath the upper edge of the hinged component.

7. The quick release fastener system according to claim 1, wherein one edge of the groove includes an angular catch to retain the other end of the handle bar.

8. A hand-operated band saw housing, the housing comprising:
   a base tray having an upper edge, the upper edge having a groove,
   a hinged lid having an upper edge, the upper edge having a recess extending therethrough,
   a handle being fixed to the upper edge of the lid,
   a spring-loaded handle bar having two bent ends, the handle bar being arranged below the handle,
   wherein one end of the handle bar is fixed to the upper edge of the lid and the other end of the handle bar extends through the recess of the upper edge of the lid to engage in the groove of the base tray, such that the handle bar, the recess and the groove form a fastener for opening and closing of the housing.

9. The housing according to claim 8, wherein one edge of the groove includes an angular catch to retain the other end of the handle bar.

10. The housing according to claim 8, wherein the one end of the handle bar is directly fixed to an exterior surface of the upper edge of the lid, such that all portions of the handle bar, except for a portion of the other end of the handle bar that engages in the groove through the recess, are positioned at an exterior of the lid.

11. The housing according to claim 10, wherein the groove is provided in an exterior surface of the upper edge of the base tray and wherein when the housing is in a closed state, the exterior surface of the upper edge of the base tray directly faces and opposes an interior surface of the upper edge of the lid, such that the groove aligns with the recess.

* * * * *